US007013052B1

(12) United States Patent
Takaoka

(10) Patent No.: US 7,013,052 B1
(45) Date of Patent: Mar. 14, 2006

(54) IMAGE PROCESSING APPARATUS

(75) Inventor: Naoki Takaoka, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/333,963

(22) Filed: Jun. 16, 1999

(30) Foreign Application Priority Data

Jun. 16, 1998 (JP) ................................ 10-168930

(51) Int. Cl.
*G06K 9/54* (2006.01)

(52) U.S. Cl. ...................................... 382/307; 382/254

(58) Field of Classification Search ................ 396/310, 396/311; 355/40; 382/167, 254, 307; 358/527; 345/700

See application file for complete search history.

(56) References Cited

U.S. PATENT DOCUMENTS 5,023,635 A * 6/1991 Nealon ........................ 354/76
5,049,929 A * 9/1991 Anderson et al. ............. 399/82
5,208,910 A * 5/1993 Higgins et al. ............. 345/820
5,808,723 A * 9/1998 Klees .......................... 355/40
5,828,461 A * 10/1998 Kubo et al. ................. 358/296
5,845,122 A * 12/1998 Nielsen et al. .............. 345/810
6,006,279 A * 12/1999 Hayes ......................... 709/328

FOREIGN PATENT DOCUMENTS

JP 3-102969 4/1991
JP 9-107462 4/1997
JP 9-214686 8/1997
JP 9-312733 A 12/1997

OTHER PUBLICATIONS

"Radio Buttons." [Excerpt from Inside Macintosh: Mac OS 8 Human Interface Guidelines.] Apple Computer, Inc. Jul. 18, 1997. http://developer.apple.com/techpubs/mac/HIGOS8Guide/thig-13.html.*

* cited by examiner

*Primary Examiner*—Vikkram Bali
*Assistant Examiner*—Colin LaRose
(74) *Attorney, Agent, or Firm*—Birch, Stewart, Kolasch & Birch, LLP

(57) ABSTRACT

An image processing apparatus collectively manages a variety of image processings. Among the image processings, there are specially designated image processings. If a combination of specially designated image processings which are not mutually compatible is designated, one of the mutually incompatible image processings is rendered invalid. Therefore, the image processing apparatus is able to carry out image processings under appropriate conditions.

20 Claims, 12 Drawing Sheets

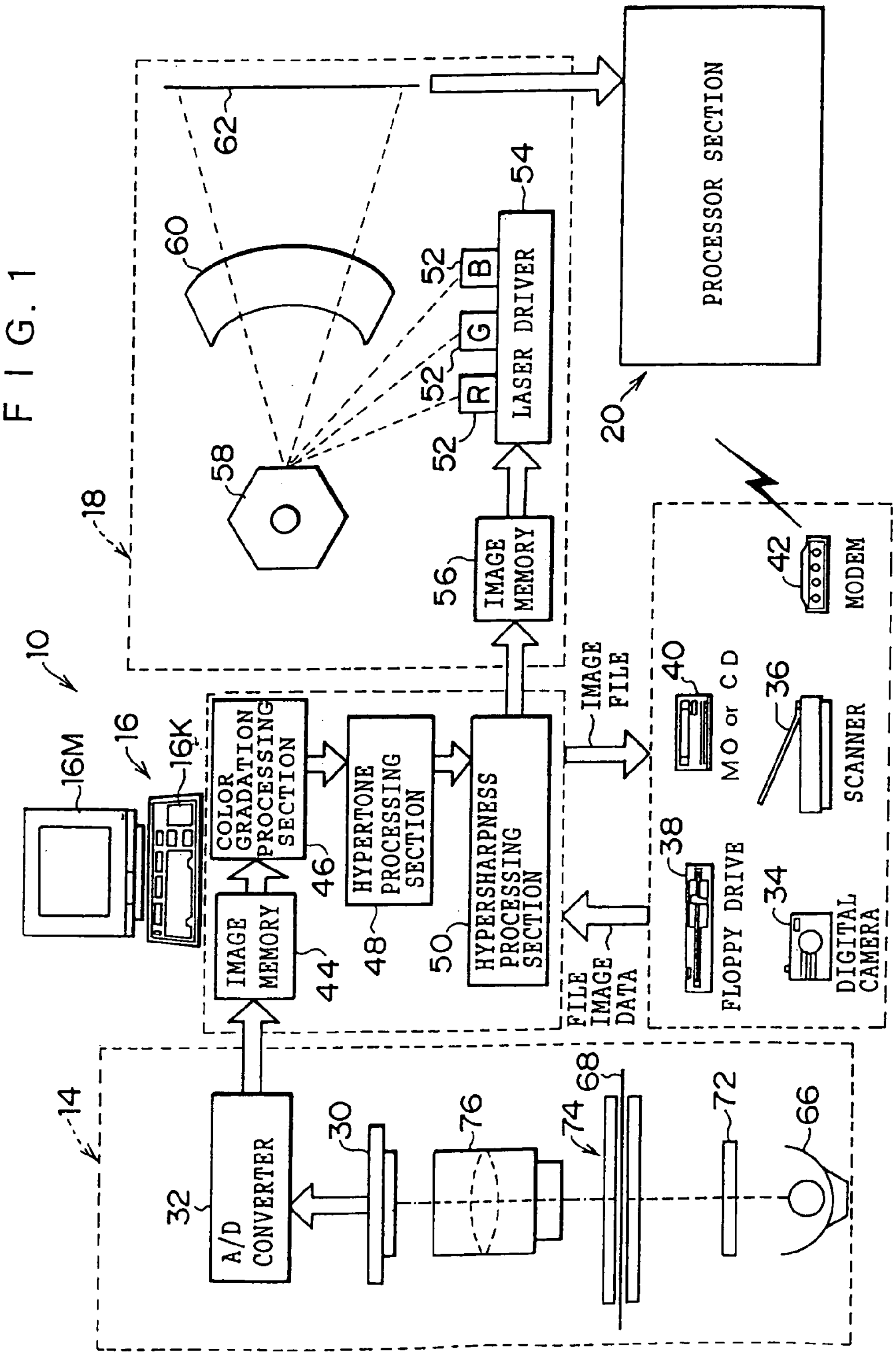
F I G. 1

F I G. 2
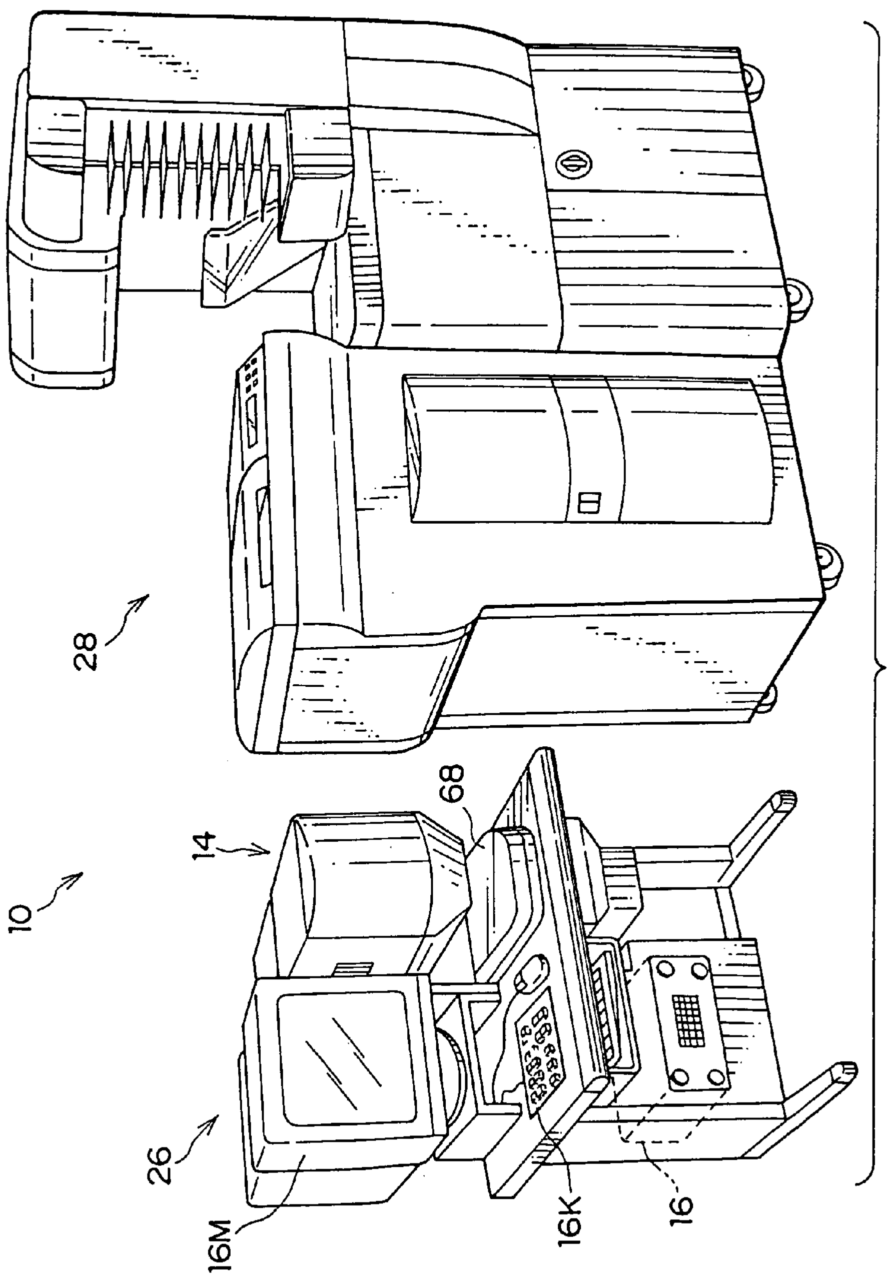

F I G. 4 A
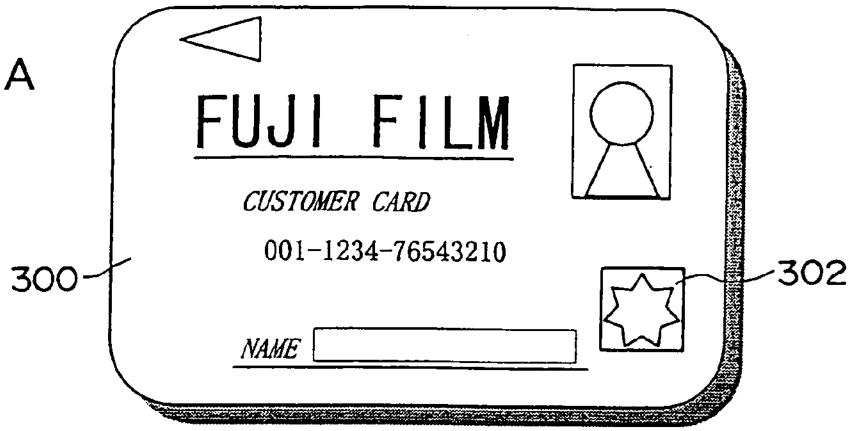
F I G. 4 B
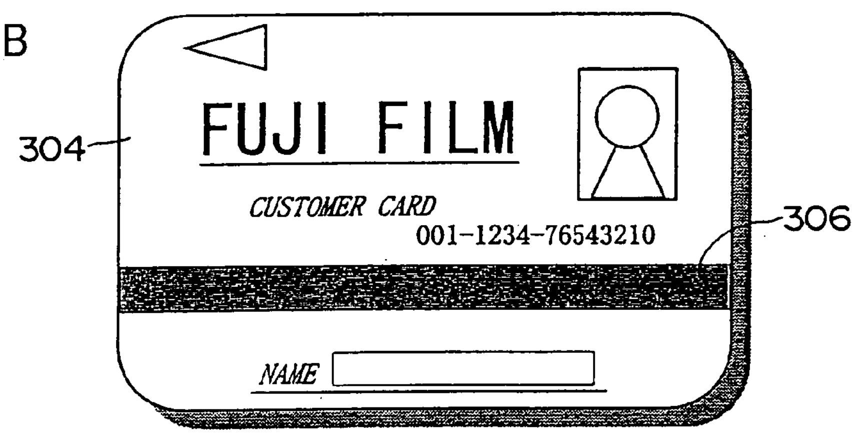
F I G. 4 C
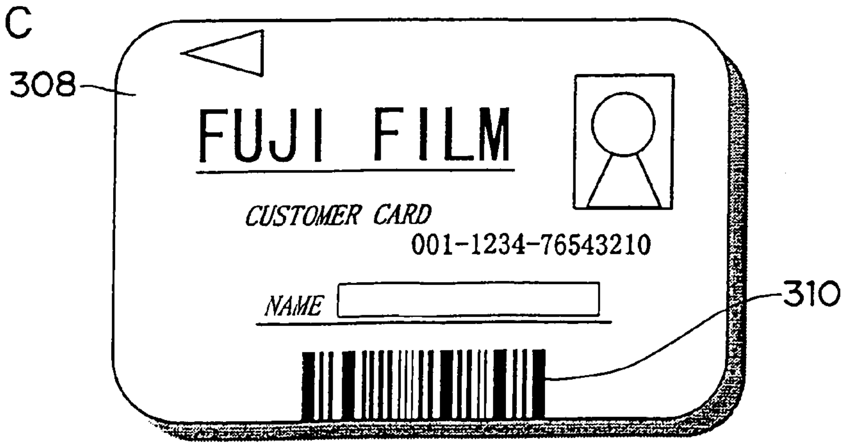

F I G. 5 A PLURAL
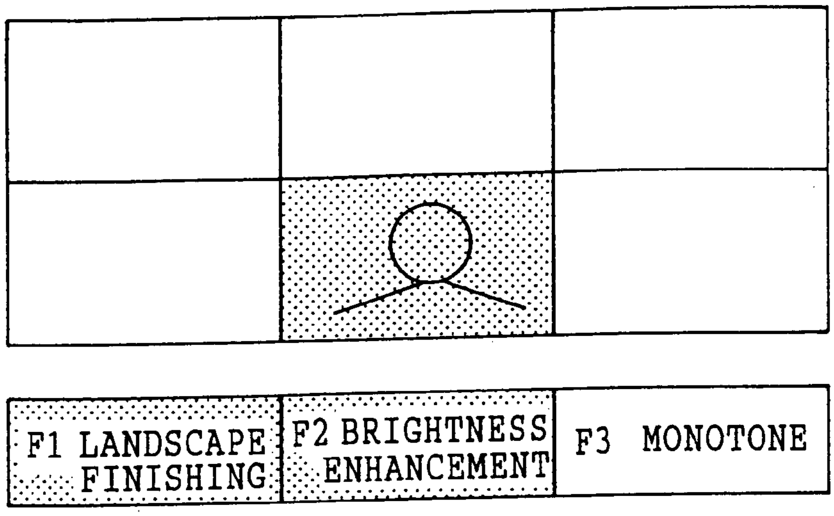
F I G. 5 B SINGLE FRAME MODE
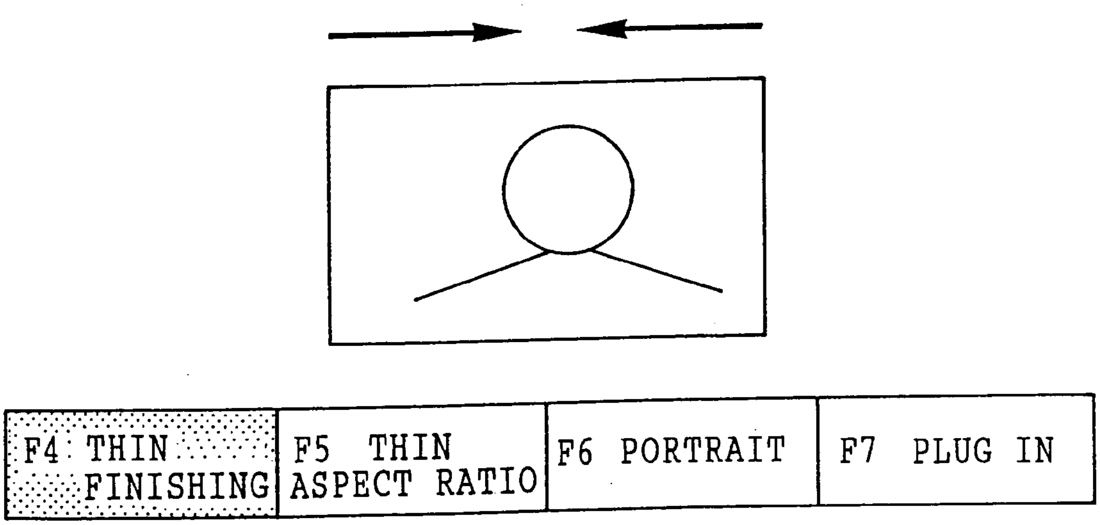

F I G. 6
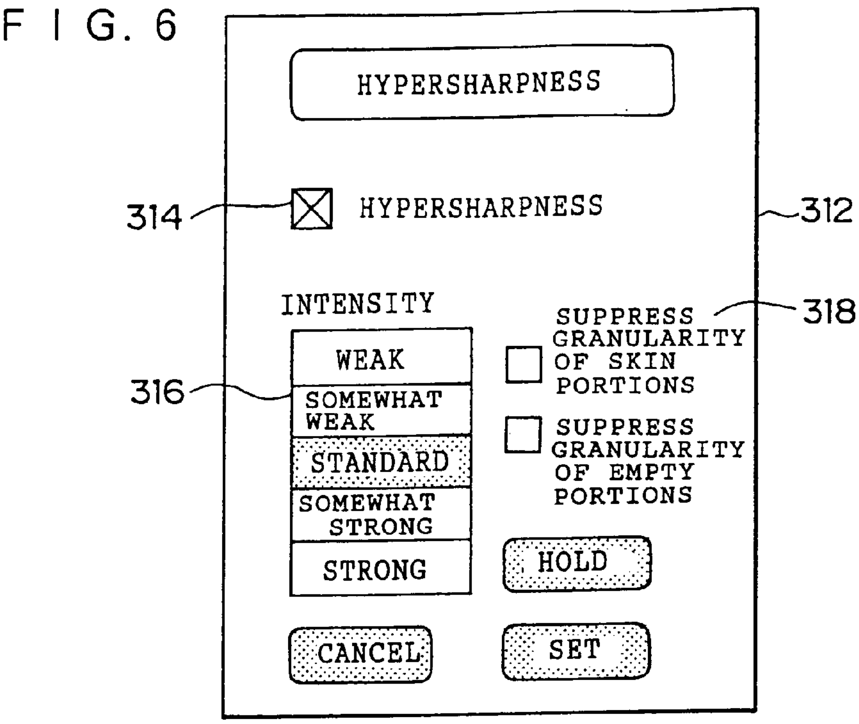
F I G. 7
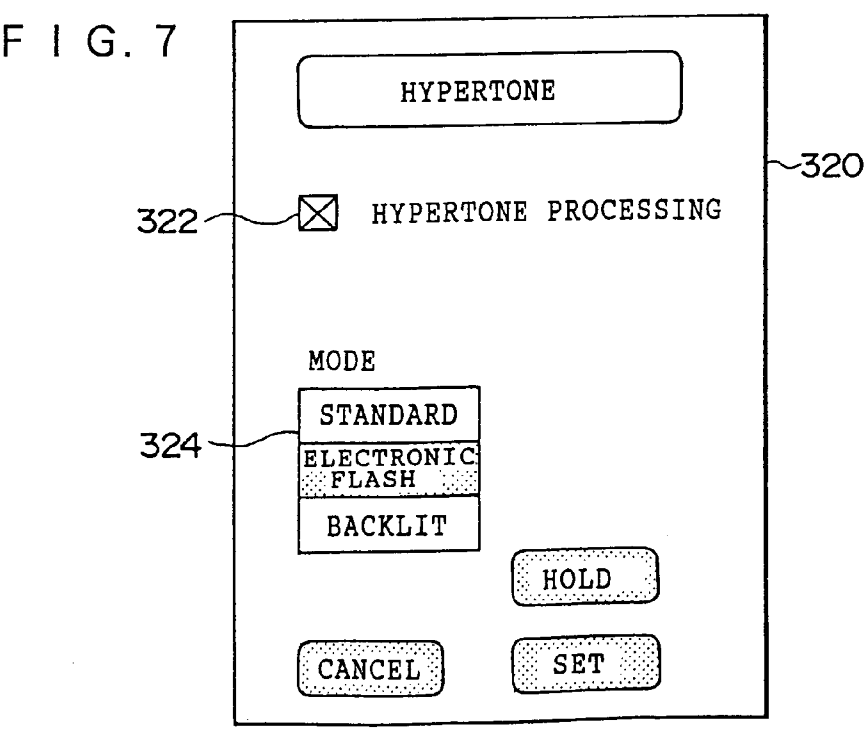

F I G. 8
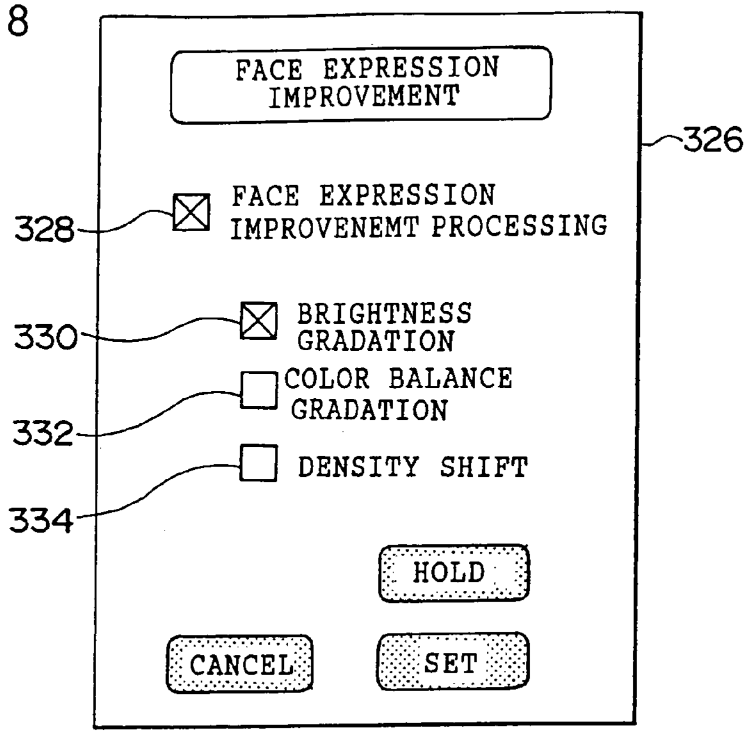
F I G. 9
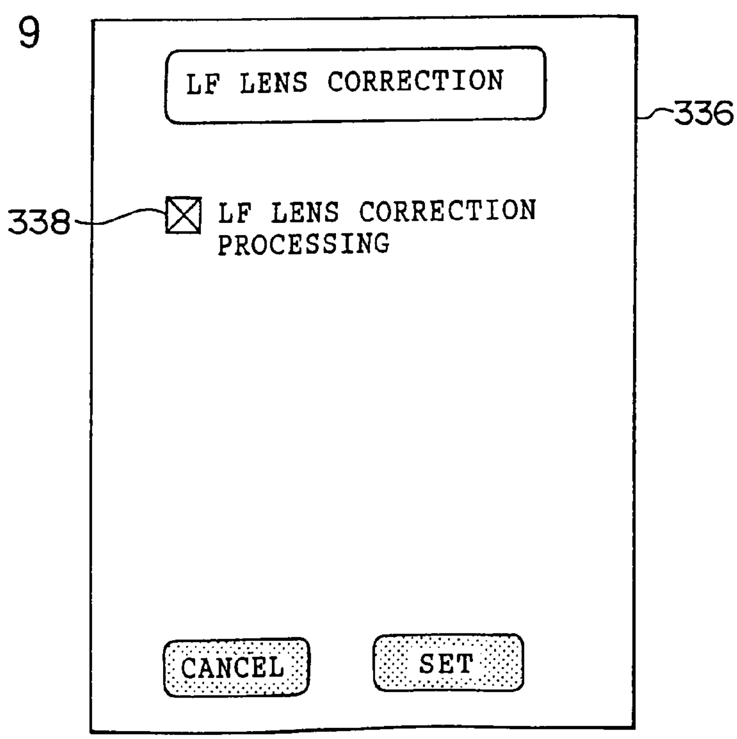

F I G. 1 5
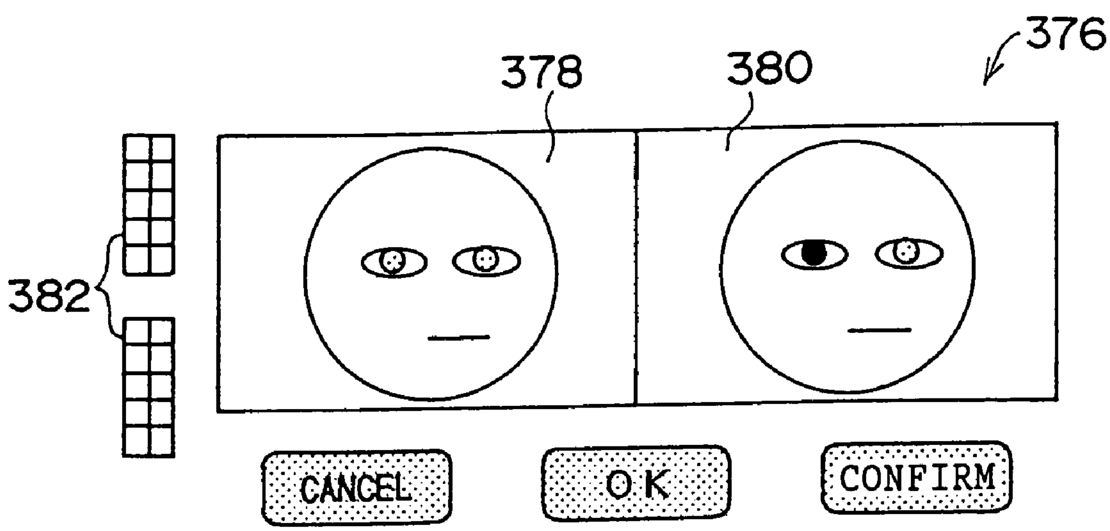

IMAGE PROCESSING APPARATUS

BACKGROUND OF THE INVENTION

1. Field of the Invention

The present invention relates to an image processing apparatus having an image reading apparatus for, digitally, reading an image recorded on a recording medium, the image processing apparatus subjecting the read digital image data to predetermined image processings and outputting the processed image data.

2. Description of the Related Art

In recent years, a technique has been known with which frame images recorded on a negative film are photoelectrically read by a reading sensor such as a CCD. Digital image data obtained by the reading processing is subjected to image processings including enlargement/reduction and a variety of corrections. Then, a laser beam modulated in accordance with the digital image data subjected to the image processings is used to form an image on a recording material.

In the technique for digitally reading frame images by using a reading sensor such as a CCD, in order to realize accurate image reading, an image frame is preliminarily read (so-called "prescanning"). Thus, reading conditions (for example, the amount of light with which the frame image is irradiated or the charge storage time in the CCD) corresponding to, for example, the density of the frame image are determined. Then, the frame image is again read (so-called "fine scanning") under the determined reading conditions.

Fine scan image data is subjected to an image processing called automatic setup which is necessarily performed for a read image. Finally, output image data is produced.

In addition to the image processings included in the automatic setup, image processings which are performed in accordance with instructions issued from an operator can be performed. Examples of image processing for improving the structural effects of the image include sharpness processing, graininess processing, photographing lens chromatic aberration correction processing, and photographing lens distortion correction processing. Example of image processings for improving color reproducibility are processings for improving color reproducibility of all images, color reproducibility of a specific region such as the face of a person, and color reproducibility of spatial frequency regions (hypertone). Examples of image processings for imparting a special effect to an original image include monotone processing, aspect ratio changing processing for changing the aspect ratio in order to change the body shape of a person in the image, red-eye correction processing and cross filter synthesizing processing. Hereinafter, these processings are called special image processings.

The above-mentioned special image processings are not performed for all of the images. The special image processings are carried out in accordance with the judgment of an operator or upon the request of the customer. For example, when a customer requires a monotone image, the request is written on an order sheet and the operator performs the processing in accordance with the contents of the order.

However, the special image processings include a plurality of types of image processings as described above. Some processings for the same image may be reciprocal processings with each other. That is, there are combinations of processings which are meaningless and combinations which are impossible from a viewpoint of the structure of the hardware. For example, the hypersharpness processing included in the sharpness processing produces a so-called sharp image by clarifying the image. On the other hand, soft focus processing intentionally blurs the image to produce a so-called soft image. Therefore, these processings cannot be performed simultaneously. Even if the processings are performed sequentially, a meaningless result is obtained.

The more the number of the special image processings increases, the more the setting of the image processings must be administered. However, administering and operating procedures for the special image processings have not been established. Therefore, the number of wasteful operations increases and working efficiency deteriorates.

SUMMARY OF THE INVENTION

In view of the facts mentioned above, an object of the present invention is to provide an image processing apparatus in which are established managing and operating procedures for special image processings which are performed upon issuance of special instructions and which are other than necessary image processing means for processing all of the images read by an image reading means, so as to improve the working efficiency.

According to a first aspect of the present invention, there is provided an image processing apparatus having an image reading device for reading, as digital image data, an image recorded on a recording medium, said image processing apparatus subjecting the read digital image data to predetermined image processing and outputting processed image data said image processing apparatus comprising necessary image processing means for carrying out a necessary image processing on all of the image data read by the image reading device; special image processing means for carrying out a special image processing on, of the image data read by the image reading device, image data which have been specially designated; and instructing means for instructing the special image processing to be carried out by said special image processing means.

According to the first aspect, all of the image data read by the image reading device are subjected to image processings by the necessary image processing means. The image data processings carried out by the necessary image processing means are called automatic setup, and are processings for making the density, the color tone and the like of a frame image to be closer to those of the original image. Moreover, color and density corrections of the image read by the image reading device are performed.

A special image processing is carried out based on the judgment of the operator. When the instruction means issues an instruction, the special image processing is performed.

That is, at least the necessary image processings and the special image processings are distinguished from each other. If no instruction is issued from the instruction means, the automatic setup is automatically performed, and the image can efficiently be processed.

A second aspect of the present invention is structured such that, in aspect, the instructing means gives instructions in accordance with the contents of a recording medium which is provided for a customer and at which the contents of an order are recorded.

According to the second aspect, the recording medium, on which or in which the contents of the order are recorded, serves as the instructing means. For example, the first time a customer brings in an order, he/she is issued a customer card, and the preferences of the customer are inputted into the customer card (e.g., the customer prefers sharp images). Then, each time the customer brings in an order, processings which suit the customer's tastes can be carried out as special image processings without the need for the customer to request such processings each time.

A third aspect of the present invention is structured such that, in the first or the second aspect, the processing which is performed by the special image processing means is an image processing which includes at least an image structure effect for correcting the overall structure of the image, a color reproduction effect for correcting the color tone of the image, and a special effect for performing a variety of special processings for the structure, the color tone or the like in accordance with the image read by the image reading device.

According to the third aspect, the special image processing means includes at least three effects, which are the image structure effect, the color reproduction effect and the special effect.

The image structure effect includes sharpness processing, graininess processing, photographing lens chromatic aberration processing, and photographing lens distortion correction processing. The color reproduction effect includes processing for reproducing the color of the image, a processing for reproducing the color of a specific region and processing for reproducing the color for a spatial frequency. The special effect includes monotone processing, processing for changing the aspect ratio, processing for correcting red-eye and cross filter processing.

Processings including these processings are classified in advance in accordance with the contents of the processings, so that the operating procedure is easily determined when an instruction is issued from the instructing means.

A fourth aspect is structured such that, in any one of the first to third aspects, of combinations of plural image processings instructed by said instructing means and to be carried out by said special image processing means, there are unsuitable combinations of image processings which unsuitable combinations are mutually opposite or meaningless, and execution of the unsuitable combinations of image processings on an image by said special image processing means is prohibited.

According to the fourth aspect, combinations which cannot be performed from the standpoint of the structure of the hardware or which are meaningless combinations are included among the image processings which are performed by the special image processing means. If such a combination is instructed, one or some of the image processings is/are canceled to realize a matching combination. Thus, the problem of the freezing-up of the apparatus can be prevented.

A fifth aspect is structured such that, in the fourth aspect, when an unsuitable combination of special image processings has been instructed by the instructing means, the special image processing instructed last is given priority and the special image processing instructed first is canceled.

According to the fifth aspect, if an unsuitable combination of special image processings is selected, the special image processings are canceled in order from the processing which was designated earliest, so that the more recently designated processes remain.

A sixth aspect is structured such that any one of the first to fifth aspects further comprises notifying an operator of the contents of the special image processings which have actually been instructed by said instructing means.

According to the sixth aspect, when a plurality of special image processings are instructed, the contents of the instructions must be managed. As one of way of managing the instructions, the notifying means which notifies the operator of the contents of the instructions is provided. For example, when a monitor for displaying an image based on the read image data is used, the contents are displayed on the monitor. When a photographic print based on the read image data is produced, the contents of the instructed processings are printed in the margin (including the reverse side) of the photographic print. Thus, the image processings which have been carried out on the read image can be confirmed.

A seventh aspect is structured such that, in any one of the first to sixth aspects, the image reading device includes a monitor which can display an image based on read image data in a plurality of display states including a single frame display state and a plural frame display state, and the instruction issued from the instructing means is made to be valid only when the contents of the image processing of the special image processing means instructed by the instructing means and the state of the display on the monitor match with a predetermined combination.

According to the seventh aspect, the image reading device has a monitor. The image based on the read image data is displayed on the monitor in one of a variety of forms including single frame display and plural frame display. Thus, if, for example, monotone processing is performed, whether or not monotone processing is to be performed can be instructed for each image frame. Thus, if a plurality of frames are being displayed but the image processing is a processing which is to be carried out one frame at a time, the contents of the image processing and the display state do not match each other. Therefore, combinations of the image processings and matching display states are determined in advance. Only when the type of the special image processing means instructed by the instructing means and the display state of the monitor match each other is the instruction from the instructing means valid. Thus, the display state of the monitor or other measures can be quickly carried out.

BRIEF DESCRIPTION OF THE DRAWINGS

FIG. 1 is a schematic view showing the structure of a digital laboratory system according to an embodiment of the present invention.

FIG. 2 is a view showing the exterior of the digital laboratory system.

FIGS. 4A, 4B and 4C are front views showing customer cards according to the embodiment.

FIGS. 5A and 5B are front views showing screens displayed on a monitor according to the embodiment.

FIG. 6 is a front view showing a screen for setting details in an image processing mode.

FIG. 7 is a front view showing a screen for setting details in the image processing mode.

FIG. 8 is a front view showing a screen for setting details in the image processing mode.

FIG. 9 is a front view showing a screen for setting details in the image processing mode.

FIG. 15 is a front view showing a screen for setting details in the image processing mode.

DESCRIPTION OF THE PREFERRED EMBODIMENT

Figure 3:
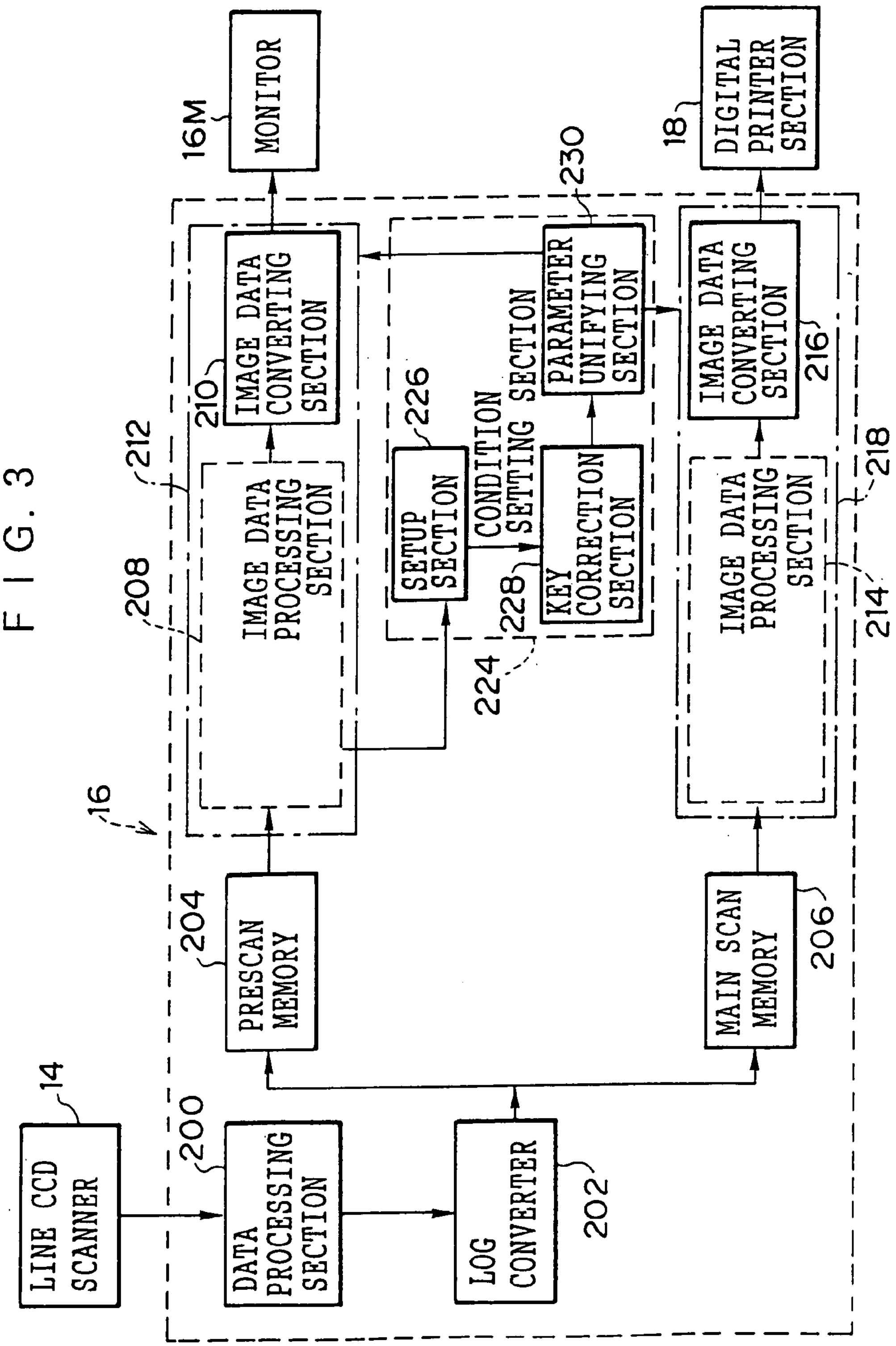
FIG. 3 is a control block diagram showing an image processing section according to the embodiment.

FIGS. 1 and 2 show the schematic structure of a digital laboratory system 10 according to this embodiment.

As shown in FIG. 1, the digital laboratory system 10 includes a line CCD scanner 14, an image processing section 16, a laser printer section 18 and a processor section 20. The line CCD scanner 14 and the image processing section 16 are unified into an input section 26 shown in FIG. 2. The laser printer section 18 and the processor section 20 are unified into an output section 28 shown in FIG. 2.

The line CCD scanner 14 reads a frame image recorded on a photographic film such as a negative film, a reversal film, or the like. For example, the line CCD scanner 14 may read the frame image of a 135 size photographic film, a 110 size photographic film, a photographic film on which a transparent magnetic layer is formed (a 240 size photographic film which is known as an APS film), a 120 size and 220 size (a brownie size) photographic films. The line CCD scanner 14 reads the frame image which is to be read by a line CCD. After A/D conversion at an A/D converting section 32, the image data is outputted to the image processing section.

In the present embodiment, the 240-size photographic film (the APS film) 68 is applied to the digital laboratory system 10.

Image data (scan image data) output from the line CCD scanner 14 is inputted to the image processing section 16. Moreover, the image processing section 16 is able to receive, from an external source, image data obtained by a photographing operation performed by a digital camera 34 or the like, image data obtained by a (flatbed) scanner 36 reading an original (for example, a reflection original), image data produced by another computer and recorded in a floppy disk drive 38, an MO drive or a CD drive 40, and communications image data received through a modem 42. (All of these image data are referred to as "file image data".)

The image processing section 16 stores the inputted image data in an image memory 44, and the image data is subjected to image processings such as various types of correction which are performed by a color gradation processing section 46, a hypertone processing section 48 and a hypersharpness processing section 50. Then, the image processing section 16 outputs the image data to the laser printer section 18 as image data for recording. Moreover, the image processing section 16 is able to output the image data subjected to the image processings to the outside as image file (for example, output the image processed data to a storage medium, such as an FD, an MO or a CD, or send the image processed data to another information processing apparatus through a telecommunications line, or the like).

The laser printer section 18 comprises R, G and B laser light sources 52. The laser printer section 18 controls a laser driver 54 to illuminate photographic printing paper with laser light modulated in accordance with the image data for recording which was inputted from the image processing section 16 (and which is temporarily stored in an image memory 56). Thus, scanning and exposure (by an optical system using a polygon mirror 58 and an f θ lens 60 in the present embodiment) are performed so that an image is recorded on a photographic printing paper 62. A processor section 20 subjects the photographic printing paper 62, on which the image was recorded by the scanning and exposing performed in the laser printer section 18, to color development, bleaching and fixing, water washing and drying processings. As a result, an image is formed on the photographic printing paper 62.

(Structure of Line CCD Scanner)

The structure of the line CCD scanner 14 will now be described. FIG. 1 shows the schematic structure of the optical system of the line CCD scanner 14. The optical system includes a light source 66 for illuminating light onto a photographic film 68. A light diffusing plate 72 for making the light which is to be illuminated onto the photographic film 68 diffused light is disposed at to the light emitting side of the light source 66.

The photographic film 68 is conveyed by a film carrier 74, which is disposed at the same side at which the light diffusing plate 72 is disposed, such that the surface of the frame image is positioned perpendicular to the optical axis.

A lens unit 76, which focuses the light passing through the frame image, and the line CCD 30 are disposed in that order on the optical axis at the side of photographic film 68 opposite the side at which the light source 66 is provided. The lens unit 76 is illustrated as having only one lens, bunt in actuality, the lens unit 76 is a zoom lens having plural leses. The lens unit 76 is illustrated as having only one lens, but in actuality, the lens unit 76 may be a SELFOC lens. In this case, it is preferable that the both end surfaces of the SELFOC lens are positioned as close as possible to the photographic film 68 and the line CCD 30.

The line CCD 30, a plurality of CCD cells are disposed in a line along the widthwise direction of the photographic film 68 which is being conveyed, and sensing portions provided with electronic shutter mechanisms are provided in three, spaced-apart, parallel lines, and one of R, G and B color separating filters is mounted to the light-incident side of each sensing portion, so as to form a so-called three-line color CCD. The line CCD 30 is disposed such that the light receiving surface of each of the sensing portions is disposed at the focusing position of the lens unit 76.

A shutter (not shown) is disposed between the line CCD 30 and the lens unit 76.

(Structure of Control System of Image Processing Section 16)

FIG. 3 is a control block diagram for performing processings which are carried out by the image memory 44, the color gradation processing section 46, the hypertone processing section 48 and the hypersharpness processing section 50, which are the main structures of the image processing section 16 shown in FIG. 1.

R, G and B digital signals output from the line CCD scanner 14 are, in a data processing section 200, subjected to predetermined data processings including dark correction, correction of defective pixels, and shading correction. Then, the digital signals are converted into digital image data (density data) by a Log converter 202. Prescan data is stored in a prescan memory 204, while main scan data is stored in a main scan memory 206.

The prescan data stored in the prescan memory 204 is transmitted to a prescan processing section 212 formed by an image data processing section 208 and an image data converting section 210. On the other hand, the main scan data stored in the main scan memory 206 is transmitted to a main scan processing section 218 formed by an image data processing section 214 and an image data converting section 216.

The image data processing sections 208 and 216 perform color balance adjustment, contrast adjustment (color gradation processing), brightness correction, saturation correction (hypertone processing) and hypersharpness processing by known methods of computation using LUTs and matrices (MTX).

The image data processing sections 208 and 216 also perform periphery light amount correction for correcting the amount of light of a peripheral section (the background) of an image.

Image processings such as the aforementioned adjustment and correction are classified into two types of processings as will be described later. One type of processings is image processings (necessary image processings) which are always performed when an image is read. To other type of processing is image processings (special image processings) which are or are not carried out in accordance with the judgment of the operator (including a request from a customer). Details of this classification will be described later.

The image data converting section 210 for the prescan section converts, on the basis of a 3D-LUT, image data processed by the image data processing section 208 into image data for display which is displayed on a monitor 16M. On the other hand, the image data converting section 216 for the main scan section converts, on the basis of a 3D-LUT, image data processed by the image data processing section 214 into image data for printing which is printed by the laser printer section 18. Note that different color systems, are used for the image data for display and the image data for printing, and the data are made coincide with each other by performing a variety of correction processings as described later.

That is, a condition setting section 224 is connected to the prescan processing section 212 and the main scan processing section 218.

The condition setting section 224 includes a setup section 226, a key correction section 228 and a parameter unifying section 230.

The setup section 226 uses prescan data to set the reading conditions for the main scan, and supplies these conditions to the CCD scanner 14. Moreover, the setup section 226 computes image processing conditions for the prescan processing section 212 and the main scan processing section 218, and supplies these conditions to the parameter unifying section 230.

In accordance with various instructions input by using keys provided at a keyboard 16K and/or a mouse for adjusting the density, color, contrast, sharpness and saturation, the key correction section 228 calculates an amount of adjustment of the image processing conditions and supplies the results of the calculation to the parameter unifying section 230.

The parameter unifying section 230 sends the image processing conditions received from the setup section 226 and the key correction section 228 to the image data processing sections 208 and 214 in the prescan section and the main scan section, so as to correct or reset the image processing conditions. In accordance with the reset image processing conditions, the prescan section displays image data on the monitor and the fine scan section outputs image data for be printed.

These processings are performed by the apparatus according to the present embodiment in a usual mode. In this case, the inputted color image data is subjected to the appropriate correction and color image data is output.

The types of the image processings will now be described. Necessary image processings include color balance adjustment, contrast adjustment (color gradation processing) and brightness correction. These processings are performed for all of the images read by the line CCD scanner 14.

On the other hand, the special image processings are performed for an image when instructed by the operator.

As shown in FIG. 4A, the operator selects and instructs appropriate image processings among the special image processings in accordance with a customer card 300 issued to each customer. The customer card 300 has an IC memory 302. Information for managing the customers including the name and address of the customer and preferences of the customer (for example, the sharpness and color tone of images) are recorded in the IC memory 302. The preferences of the customer are classified into processings which must be performed on all orders from the customer and processings which are performed for an order when the customer desires such processing. The laboratory reads all of the orders and determines whether a processing is to be carried out for each image frame or for the film. The customer card is not limited to having the IC memory 302. As shown in FIG. 4B, a customer card 304 may be employed in which a magnetic tape 306 is adhered to the front surface (or the back surface) of the card to magnetically record information. As shown in FIG. 4C, a customer card 308 may be employed which is provided with only an identification code 310 such as a bar code, and information is stored in a database of the laboratory. Thus, the laboratory reads the identification code (the bar code) 310 to obtain information from the database.

Table 1 shows a list of the special image processings which are performed on an image read by the line CCD scanner 14 by the image processing section 16 according to the present embodiment.

TABLE 1

| | Contents of Image Processing | State of Use | Screen Mode | Set Term of Validity | Set Value at Start |
|---|---|---|---|---|---|
| 1 | LF Lens Correction | Simultaneous Printing | Plural Frame Mode | A/B | — |
| 2 | Hyper-sharpness | Simultaneous Printing | Plural Frame Mode | A/B/C | — |
| 3 | Hypertone | Simultaneous Printing | Plural Frame Mode | A/B/C | Previous Set Value |
| 4 | Face Expression Improvement | Simultaneous Printing | Plural Frame Mode | A/B/C | Previous Set Value |
| 5 | RP Finish | Simultaneous Printing | Plural Frame Mode | A/B/C | Previous Set Value |
| 6 | Monotone Finish | Re-Order | Plural Frame Mode | B/C | Previous Set Value |
| 7 | Brightness En-hancement | Re-Order | Plural Frame Mode | C | — |
| 8 | Fine Finish | Re-Order | Single Frame Mode | C | Default Value |
| 9 | Portrait Finish | Re-Order | Single Frame Mode | C | Default Value |
| 10 | Red-Eye Correction | Re-Order | Single Frame Mode | C | Default Value |
| 11 | Cross Filter | Re-Order | Single Frame Mode | C | Default Value |

Note that A, B and C in Table 1 have the following meanings:
A: previous setting is valid until setting is changed next;
B: previous setting is valid until sorting is performed (for example, until one order is completed); and
C: valid only for frame being processed.

There are states of use of the image processings shown in Table 1. That is, the image processings are classified into those which can be performed when simultaneous printing is carried out and those which can be performed only when re-ordering is carried out. The state of use of the image frame which is to be processed is determined.

The image processings are also classified depending on the display mode on the monitor 16M. As shown in FIGS. 5A and 5B, the monitor 16M has a mode (see FIG. 5A) for displaying a plurality of frames (for example, six frames) and a mode for displaying one frame (see FIG. 5B). Each of the image processings has a display mode. For example, image processings which must be processed in the single frame display mode include fine finishing (a processing for changing the aspect ratio of the image to make a photographed person look thinner), portrait finishing (the main object is made clear and the peripheral image is blurred), red-eye correction processing, and cross filter (soft) finishing. When any of these image processings have been instructed it must be determined whether the image processing matches the display screen made of the monitor 16M. In each display mode, the image and the contents of image processings which can be performed are displayed. Moreover, function key numbers for starting (turning on) each image processing are displayed.

In the present embodiment, when the instructed contents of the image processing and the display mode match each other, the instructed image processing is valid. When the contents of the image processing and the display mode do not match each other, measures for making the instructed image invalid are taken. That is, if a function key which is not displayed together with the image is operated, the operation is invalid.

In a case in which the desired image processing designated by the operator is valid (ON), the set term of validity expresses how long the period of validity should be maintained for. Further, the set value at start expresses whether the initial set value at the time an image processing starts is to be cleared (represented by the dash in Table 1) or is to be the final set value from the previous time, or is to be a default value.

Among the combinations of the processings in Table 1, there are some combinations which are impossible from the standpoint of the structure of the hardware, and some combinations which would be meaningless even if carried out. Following Table 2 shows the suitability of the respective combinations of image processings.

TABLE 2

| | HS | HT | FU | LF | RP | BU | MT | TB | PO | RE | XF | SF |
|---|---|---|---|---|---|---|---|---|---|---|---|---|
| HS | | ○ | ○ | ○ | ○ | ○ | ○ | ○ | X | ○ | ○ | X |
| HT | OK | | ○ | ○ | ○ | ○ | ○ | ○ | ○ | ○ | ○ | X |
| FU | OK | OK | | ○ | ○ | ○ | ○ | ○ | ○ | ○ | ○ | ○ |
| LF | OK | OK | OK | | ○ | ○ | ○ | ○ | ○ | ○ | ○ | ○ |
| RP | OK | OK | OK | OK | | ○ | ○ | ○ | ○ | ○ | ○ | ○ |
| BU | OK | OK | OK | OK | OK | | ○ | ○ | ○ | ○ | ○ | ○ |
| MT | OK | OK | OK | OK | OK | OK | | ○ | ○ | ○ | ○ | ○ |
| TB | OK | OK | OK | OK | OK | OK | OK | | ○ | ○ | ○ | ○ |
| PO | NG | OK | OK | OK | OK | OK | OK | OK | | ○ | ○ | X |
| RE | OK | OK | OK | OK | OK | OK | OK | OK | OK | | ○ | ○ |
| XF | OK | OK | OK | OK | OK | OK | OK | OK | OK | OK | | ○ |
| | NG | NG | OK | OK | OK | OK | OK | OK | OK | OK | OK | |

Note that the symbols shown in Table 2 represent the following.
HS: hypersharpness
HT: hypertone
FU: face expression improvement
LF: LF lens correction
RP: RP finishing
BU: brightness enhancement
MT: monotone finishing
TB: thin finishing
PO: portrait finishing
RE: red-eye correction
XF: cross filter
SF: soft finishing In Table 2, "OK" (O) indicates that the combination is possible and "NG" ($^{x}$) indicates that the combination is not possible. In the present embodiment, the following four combinations cannot be employed: hypersharpness and portrait finishing, hypersharpness and soft finishing, hypertone and soft finishing, and portrait finishing and soft finishing. Note that the impossible combinations of the image processings shown in Table 2 are impossible. The operator can set respective image processings for each customer. Moreover, three or more image processings may be combined. That is, any combination may be arbitrarily set if the hardware environment of the user is suited thereto.

When an image processing has been instructed by the operator and the validity of the image processing has been confirmed, a processing screen (a detail setting screen) is displayed on the monitor 16M. A different processing screen is displayed for each of the selected, valid image processings. Note that the designation by the operator can be performed by a usual operation of a computer, such as a, so-called pull down operation, a pull up operation, use of the function key, or the like.

FIGS. 6 to 15 show the detailed setting screens displayed when execution of the image processings shown in Table 1 has been instructed.

FIG. 6 shows a hypersharpness screen 312 which includes a confirming portion 314 for confirming whether or not the hypersharpness processing has been set (the mark x indicates "has been set"), a setting portion 316 for setting the intensity (weak, somewhat weak, standard, somewhat strong and strong), and a selecting portion 318 for selecting whether or not processing for suppressing granularity of skin portions and processing for suppressing granularity of empty portions are to be performed.

FIG. 7 shows a hypertone screen 320 including a confirming portion 322 for confirming whether or not hypertone processing has been set (the mark x indicates "has been set"), and a setting portion 324 for setting a mode (standard, electronic flash and backlit).

FIG. 8 shows a face expression improving screen 326 which includes a confirming portion 328 for confirming whether or not face expression improvement has been set (the mark x indicates "has been set"), and setting portions 330, 332 and 334 for setting the brightness gradation, color balance gradation and density shift.

FIG. 9 shows an LF lens correction screen 336 including a confirming portion 338 for confirming whether or not LF lens correction has been set (the mark x indicates "has been set")

Figure 10:
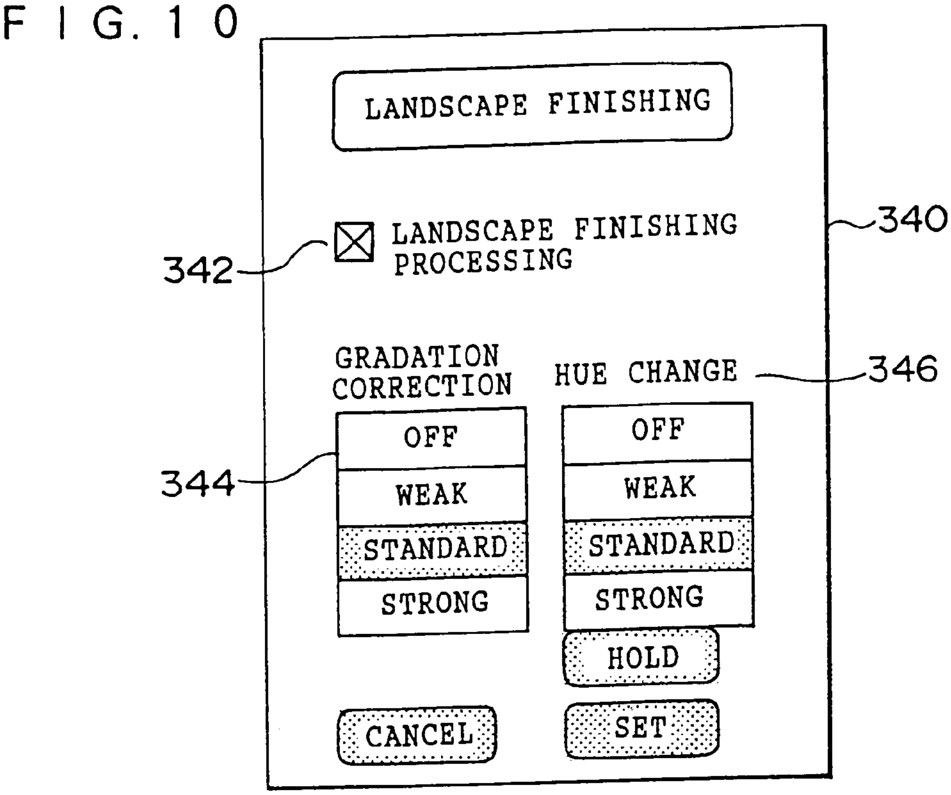
FIG. 10 is a front view showing a screen for setting details in the image processing mode.

FIG. 10 shows an RP (landscape) finishing screen 340 including a confirming portion 342 for confirming whether or not RF finishing has been set, (the mark x indicates "has been set") a setting portion 344 for setting gradation correction (off, weak, standard and strong) and a setting portion 346 for setting a change of the hue (off, weak, standard and strong).

Figure 11:
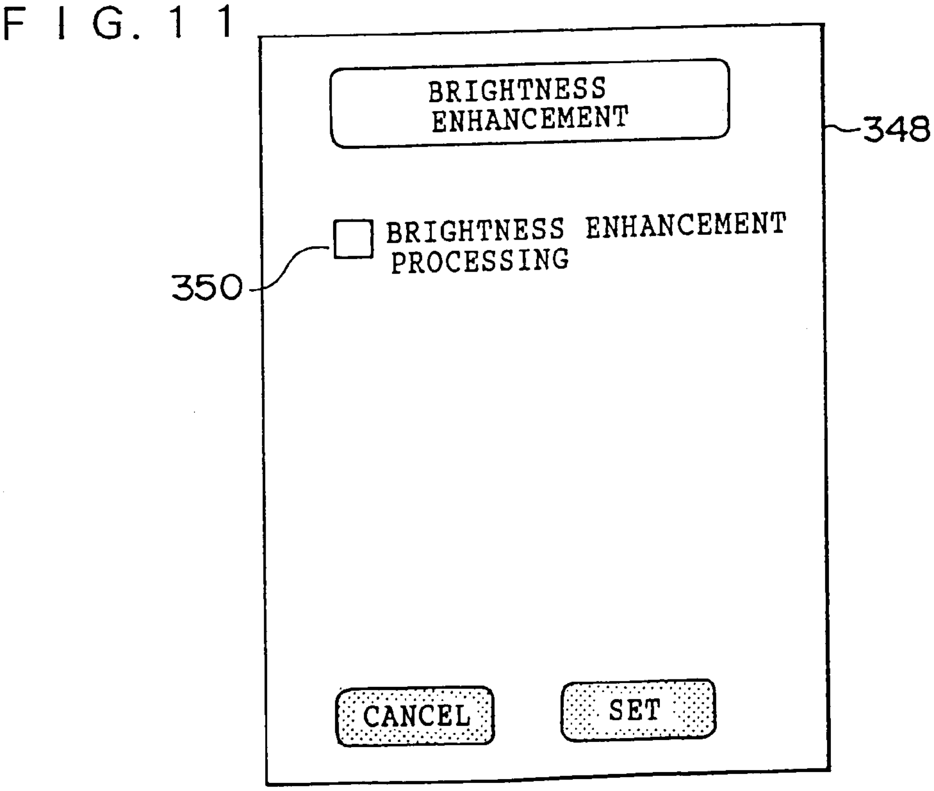
FIG. 11 is a front view showing a screen for setting details in the image processing mode.

FIG. 11 shows a brightness enhancing screen 348 including a confirming portion 350 for confirming whether or not enhancement of the brightness has been set (the mark x indicates "has been set").

Figure 12:
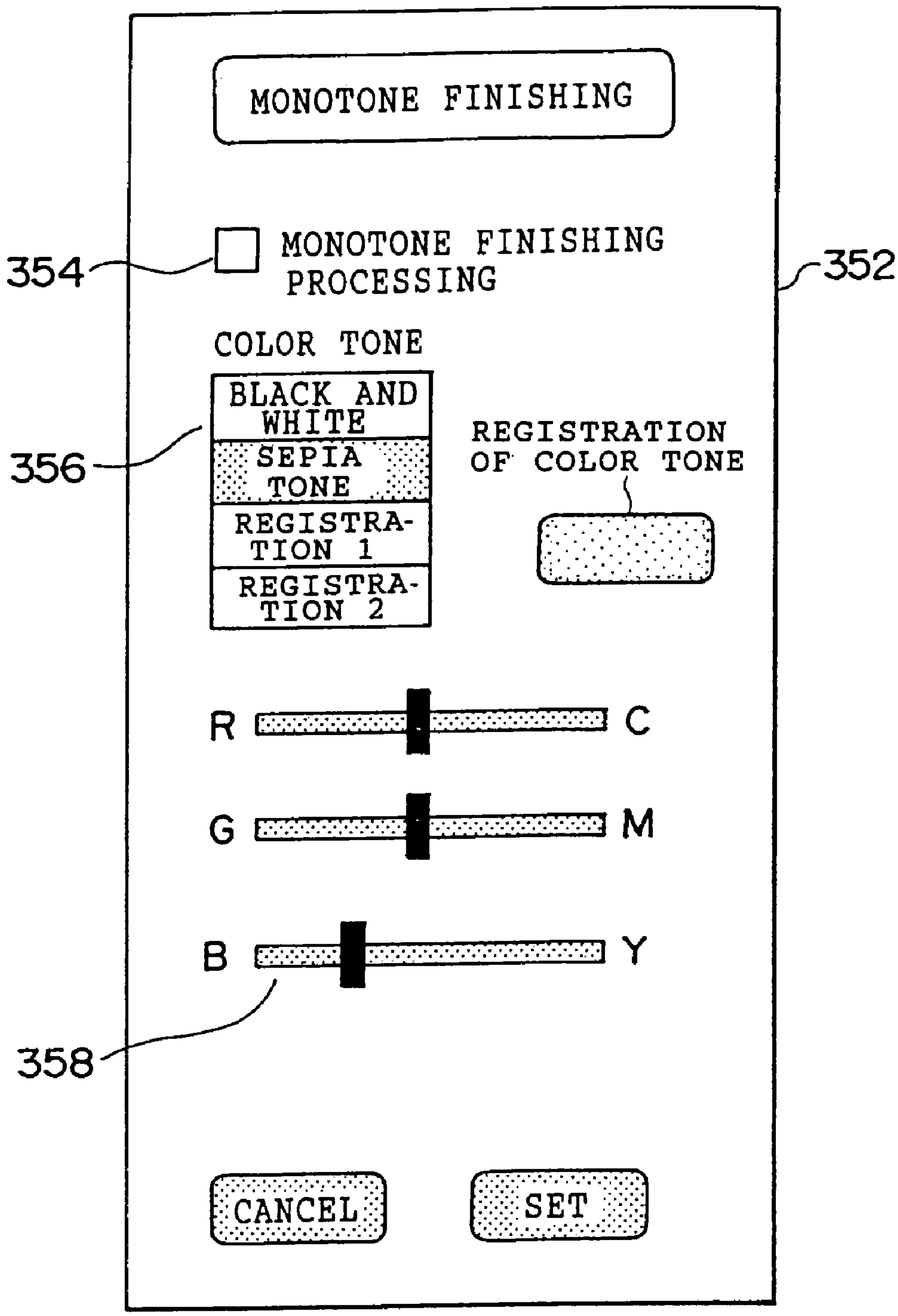
FIG. 12 is a front view showing a screen for setting details in the image processing mode.

FIG. 12 shows a monotone finishing screen 352 including a confirming portion 354 for confirming whether or not the monotone processing has been set (the mark x indicates "has been set"), a setting portion 356 for setting the color tone (black-and-white, sepia tone, registration 1 and registration 2) and a gauge operation setting portion 358 for setting the respective colors by operating gauges. Note that the monotone finishing screen 352 has a sub-screen (not shown) for registering a color tone to permit setting of a monotone color other than black-and-white and the sepia tone.

Figure 13:
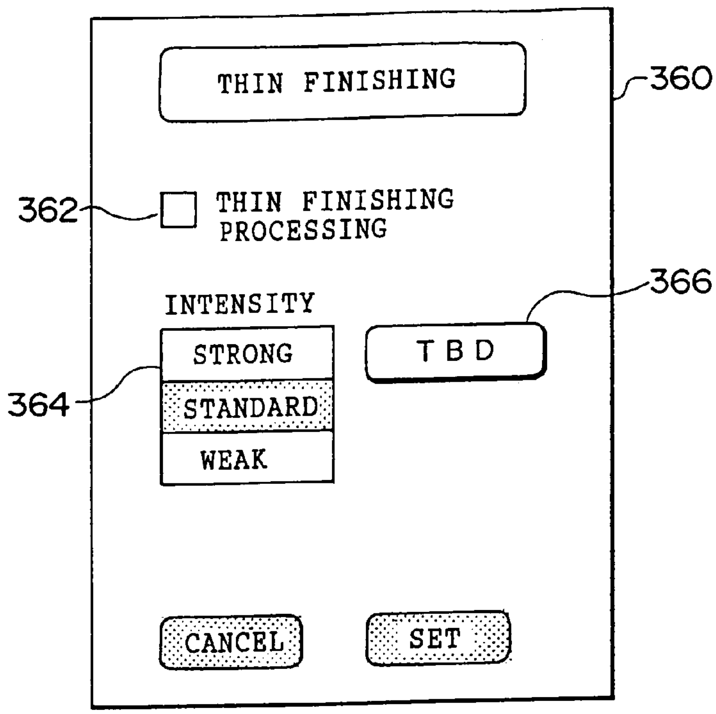
FIG. 13 is a front view showing a screen for setting details in the image processing mode.

FIG. 13 shows a thin finishing screen 360 including a confirming portion 362 for confirming whether or not thin finishing has been set (the mark x indicates "has been set"), a setting portion 364 for setting the intensity (strong, standard and weak), and a TBD setting portion 366.

Figure 14:
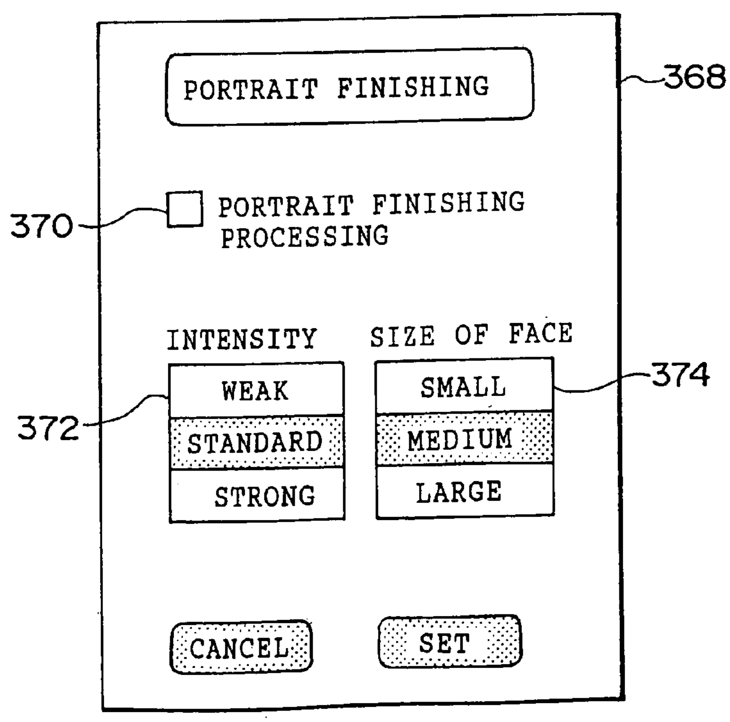
FIG. 14 is a front view showing a screen for setting details in the image processing mode.

FIG. 14 shows a portrait finishing screen 368 including a confirming portion 370 for confirming whether or not portrait finishing has been set (the mark x indicates "has been set"), a setting portion 372 for setting the intensity (weak, standard and strong), and a setting portion 374 for setting the size of the face (small, medium and large).

Figure 16:
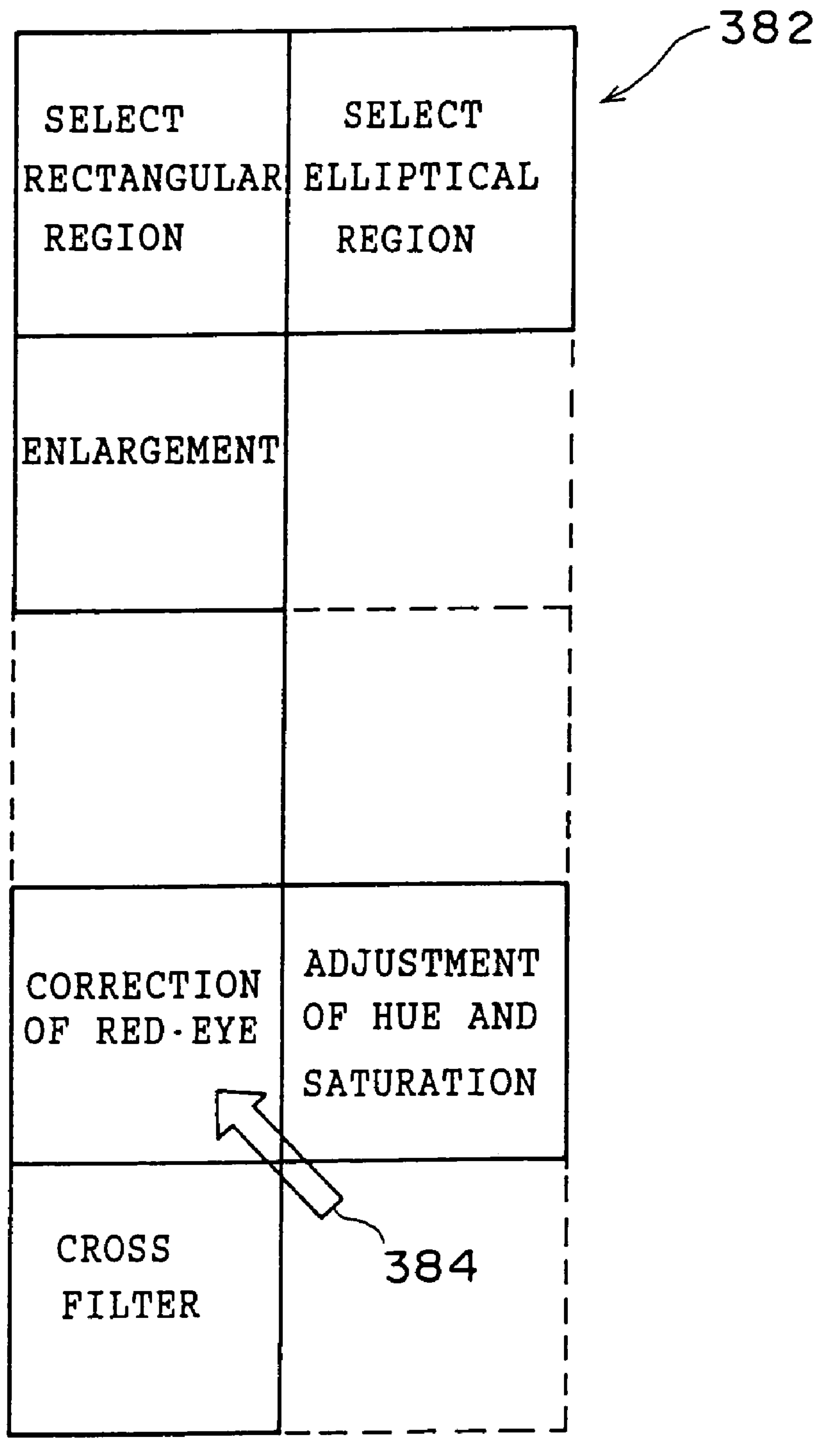
FIG. 16 is an enlarged view showing a template for the screen for setting details shown in FIG. 15.

FIG. 15 shows a red-eye correction screen 376 having two display portions 378 and 380 to permit both a pre-correction image and a post-correction image to simultaneously be observed. A template 382 (see FIG. 16) is disposed adjacent to the display portions 378 and 380. As shown in FIG. 16, the template 382 has a plurality of command buttons for performing selection of a rectangular region, selection of an elliptical region, setting of enlargement, and adjustment of the hue and saturation.

The red-eye correction screen 376 may be commonly used as the cross filter screen and the soft finishing screen.

That is, the template 382 has command buttons for selecting any one of the red-eye correction, the cross filter and soft finishing. A mouse pointer 384 is operated to indicate the processing, and then a clicking operation is performed to change the setting.

The operation of the present embodiment will now be described.

(Normal Mode)

When the operator has inserted the photographic film 68 into the film carrier 74 and instructed start of reading of the frame image by operating the keyboard 16K of the image processing section 16, the film carrier 74 starts conveying the photographic film 68. As a result of this conveying, prescanning is performed. Namely, while the photographic film 68 is being conveyed at a relatively high speed, the line CCD scanner 14 reads the image frames as well as various data provided at regions of the photographic film 68 other that the regions at which the images are recorded.

Then, magnetic (optical) information is read to recognize the size of the frame image. For example, when the frame image is panorama size, blank sections (the two ends of the photographic film in the transverse direction) particular to panorama size images are shielded from light.

Then, parameters for the image processings for the photographed image including an amount of color correction, an amount of density correction and an amount of correction of the distortion aberration (which are amounts for necessary image processings) are calculated. Then, the reading conditions (the stop) for the fine scan are calculated.

Then, fine scanning is carried out, the parameters for the image processing for the photographed image are set and correction of the photographed image is performed. The corrected fine scan image data is converted into a RGB color system when a photographic print is to be produced, and then printing (here, scanning and exposing performed by the laser printer) onto photographic printing paper is performed.

The above describes a case in which only the necessary image processings are performed. When processing is to be carried out rapidly such as during simultaneous printing, this enables the highest working efficiency to be realized.

When an image has been photographed by, for example, an LF, LF lens correction is added to the highest-speed processing as a special image processing in order to correct the reduction in the light amount of the peripheral image portions caused by the LF lens. If the setting is performed once, as shown in Table 1, the setting can be maintained until the operator performs setting again. Therefore, the processing (the correction) is performed for all of the image frames in addition to the necessary image processings.

Special image processings which can be selected when simultaneous printing is performed include hypersharpness processing, hypertone processing, face expression improvement processing and RP finishing, as can be seen from Table 1. In accordance with an instruction issued from the operator, the image processing is performed simultaneously with the necessary image processings.

The special image processings are set based on the judgment of the operator, and are often set to satisfy the wishes of the customer as stored in the customer card 300 (or 304 or 308).

When a customer requests simultaneous printing, the customer presents his/her customer card 300. The IC memory 302 (see FIG. 4A) of the customer card 300 has the preferences of the customer stored therein. For example, various likes of the customer, such as emphasizing the sharpness to clearly express outlines, and making the color tones of the image distinct are stored. Thus, even if the customer does not inform the laboratory (or the shop to which the customer brings an order) of his/her particular preferences each time the customer bring in an order, the laboratory can quckly and accurately know of the customer's wishes by reading the information form the IC memory 302 of the customer card 300. Further, if the customer makes a new request when bringing in an order, that request is stored in the IC memory 302, and can be confirmed at the time the customer brings in his/her next order. For example, if a customer requested RP finishing last time, he/she can be asked if RP finishing should also be carried out this time.

Although the above describes image processings carried out during simultaneous printing, these image processings can also be carried out at the time of reordering. Further, the following image processings can only be set as valid processings when reordering is carried out. The special image processings which are permitted for recording include, as shown in Table 1, monotone finishing, brightness enhancement, thin finishing, portrait finishing, red-eye correction, cross filter finishing and soft finishing. The processing requested by the customer at the time of their placing their order may be selected. Some of the special image processings must be set on a frame-by-frame basis (see Table 1). The detailed order is stored in the IC memory 302 of the customer card 300 so as to prevent the laboratory from performing an incorrect processing.

Some of the combinations of the special image processings are not possible. As shown in Table 2, in the initial setting, the following four combinations cannot be selected: hypersharpness and portrait finishing, hypersharpness and soft finishing, hypertone and soft finishing and portrait finishing and soft finishing. If any of these combinations is set, the item (the image processing) set previously is canceled and the item set afterwards is made to be valid.

Moreover, the state of the display on the manitor 16M of each of the image processigs is determined as shown in Table 1. LF lens correction, hypersharpness, hypertone, face expression improvement, RP finishing, monotone finishing and brightness enhancement may be processed in the mode in which a plurality of frames (for example, six frames) are displayed on the monitor 16M (see FIG. 5B). The other processings must be performed in only the mode in which single frame is displayed. If the contents of the image processing and the display mode do not match with each other, the designated image processing is made to be invalid.

According to the present embodiment, the various image processings are collectively managed. The state of use (simultaneous printing or re-ordering), the screen mode (plural frame display or single frame display), the term over which the setting is valid, the set value at the time of start, and the method of switching between on and off (for example, the pull down method or the function key method) are determined in advance. If the settings do not match with each other, the processing is made to be invalid. Therefore, the image processing can be performed in an appropriate state.

Even if an improper combination is selected, i.e., even if a combination which is impossible in light of the structure of the hardware is selected or a combination which is meaningless because the processings are mutually opposite is selected, respective combinations of processings are set in advance as shown in Table 2. Thus, even if such an improper combination is selected, only the processing of the most recent (last) designation is used. Thus, a situation can be prevented in which processings, which cannot both be carried out in light of the structure of the hardware, are executed anyway, thus causing problems with the control system. Further, a situation can be prevented in which mutually opposite processings are both carried out and cancel each other out, resulting in the final image being no different than the original image.

In addition to the aforementioned plurality of image processings, other examples of special image processings which may be introduced include a variety of retouch processings such as mirror (right and left or top and down) processing, negative/positive inverting processing, color pencil touch processing, poster type processing and posted bill processing, as well as background exchange processing, layer transparent processing, and the like.

What is claimed is:

1. An image processing apparatus for processing an image recorded on a recording medium, said image processing apparatus comprising:

an image reading device for reading the image recorded on the recording medium as digital image data, subjecting the read digital image data to predetermined image processing, and outputting processed image data;

means for carrying out a necessary image processing on all of the image data read by the image reading device;

means for carrying out a special image processing on the image data read by the image reading device, the special image processing being specially designated by an operator request and includes at least two separate special image processes; and means for instructing the special image processing to be carried out by said special image processing means, wherein the special image processing is canceled if said at least two separate special image processes have not been linked together in advance as a suitable combination, wherein the special image processing is not canceled if said at least two separate special image processes have been linked together in advance as a suitable combination, and wherein said at least two separate special image processes are stored in said image processing apparatus regardless of whether said at least two special image processes have been linked together in advance as suitable combinations.

2. The image processing apparatus according to claim 1, wherein said instructing means gives an instruction in accordance with the contents of a recording medium which is provided for a customer and at which the contents of an order are recorded.

3. The image processing apparatus according to claim 2, wherein the processing which is performed by said special image processing means is an image processing which includes at least an image structure effect for correcting the overall structure of the image, a color reproduction effect for correcting the color tone of the image, and a special effect for performing a variety of special processings for the structure and the color tone in accordance with the image read by the image reading device.

4. The image processing apparatus according to claim 2, further comprising means for notifying an operator of the contents of the special image processings which have actually been instructed by said instructing means.

5. The image processing apparatus according to claim 2, wherein said image reading device includes a monitor which can display an image based on read image data in a plurality of display states including a single frame display state and a plural frame display state, and an instruction issued from said instructing means is only valid when the contents of the image processing of said special image processing means instructed by said instructing means and the display state of the monitor have been linked together in advance as a suitable combination.

6. The image processing apparatus according to claim 1, wherein the processing which is performed by said special image processing means is an image processing which includes at least an image structure effect for correcting the overall structure of the image, a color reproduction effect for correcting the color tone of the image, and a special effect for performing a variety of special processings for the structure and the color tone in accordance with the image read by the image reading device.

7. The image processing apparatus according to claim 6, further comprising notifying means for notifying an operator of the contents of the special image processings which have actually been instructed by said instructing means.

8. The image processing apparatus according to claim 6, wherein said image reading device includes a monitor which can display an image based on read image data in a plurality of display states including a single frame display state and a plural frame display state, and an instruction issued from said instructing means is only valid when the contents of the image processing of said special image processing means instructed by said instructing means and the display state of the monitor have been linked together in advance as a suitable combination.

9. An image processing apparatus according to claim 1, wherein a special image processing instructed last is given priority and a special image processing instructed first is cancelled when said at least two separate special image processes have not been linked together in advance as a suitable combination.

10. The image processing apparatus according to claim 1, further comprising means for notifying an operator of the contents of the special image processings which have actually been instructed by said instructing means.

11. The image processing apparatus according to claim 1, wherein said image reading device includes a monitor which can display an image based on read image data in a plurality of display states including a single frame display state and plural frame display state, and an instruction issued from said instructing means is only valid when the contents of the image processing of said special image processing means instructed by said instructing means and the display state of the monitor have been linked together in advance as a suitable combination.

12. The image processing apparatus according to claim 1, wherein said at least one of said separate special image processes is selected from the group consisting of LF Lens Correction, Hypersharpness, Hypertone, Facial Expression Improvement, RP Finish, Monotone Finish, Brightness Enhancement, Fine Finish, Portrait Finish, Red Eye Correction, Cross Filter, Mirror, Negative/Positive Inverting, Color Pencil Touch, Poster Type, Posted Bill, Background Exchange and Layer Transparent processes.

13. An image processing apparatus for processing an image recorded on a recording medium, said image processing apparatus comprising:

an image reading device for reading the image recorded on the recording medium as digital image data, subjecting the read digital image data to predetermined image processing, and outputting processed image data;

means for carrying out a necessary image processing on all of the image data read by the image reading device;

means for carrying out a special image processing on the image data read by the image reading device, the special image processing being specially designated by an operator request and includes a combination of at least two separate image processes; and means for instructing the special image processing to be carried out by said special image processing means, wherein unsuitable combinations of image processings are prohibited from being executed on the image by said special image processing means and suitable combinations of image processings are permitted to be executed on the image by said special image processing means, said unsuitable combinations of image processings including a predetermined combination of two or more separate special image processes, wherein said predetermined combination includes an unsuitable combination of special image processes, and wherein said at least two separate special image processes are stored in said image processing apparatus regardless of whether said at least two special image processes are suitable or unsuitable combinations.

14. The image processing apparatus according to claim 13, wherein said necessary image processing includes at least one of color balance adjustment, contrast adjustment and adjustment correction, wherein said special image processing includes at least one of LF Lens Correction, Hypersharpness, Hypertone, Facial Expression Improvement, RP Finish, Monotone Finish, Brightness Enhancement, Fine Finish, Portrait Finish, Red Eye Correction, Cross Filter, Mirror, Negative/Positive Inverting, Color Pencil Touch, Poster Type, Posted Bill, Background Exchange and Layer Transparent processes, and wherein said unsuitable combinations of image processings including a predetermined combination of at least two separate special image processes are selected from the group consisting of LF Lens Correction, Hypersharpness, Hypertone, Facial Expression Improvement, RP Finish, Monotone Finish, Brightness Enhancement, Fine Finish, Portrait Finish, Red Eye Correction, Cross Filter, Mirror, Negative/Positive Inverting, Color Pencil Touch, Poster Type, Posted Bill, Background Exchange and Layer Transparent Processes.

15. An image processing apparatus for processing an image recorded on a recording medium, said image processing apparatus comprising:

an image reading device for reading the image recorded on the recording medium as digital image data, subjecting the read digital image data to predetermined image processing, and outputting processed image data;

an image processing section storing the digital image data and for carrying out necessary image processing and special image processing, wherein said image processing section for carrying out necessary image processing and said special image processing includes automatically carrying out a necessary image processing on all of the digital image data read by the image reading device;

selectively carrying out a selected special image processing on the digital image data read by the image reading device when the special image processing is specifically designated by an operator request and includes at least two separate special image processes; and prohibiting unsuitable combinations of special image processings from being executed on the image by said image processing section and permitting suitable combinations of special image processings to be executed on the image by said image processing section, said unsuitable combinations of image processings including a predetermined combination of two or more separate special image processes, wherein said predetermined combination includes an unsuitable combination of special image processes, and wherein said at least two separate special image processes are stored in said image processing apparatus regardless of whether said at least separate two special image processes are suitable or unsuitable combinations.

16. The image processing apparatus according to claim 15, wherein said operator request designating said selected special image process is stored in a customer specific identification card or a database.

17. The image processing apparatus according to claim 16, wherein said customer specific identification card includes at least one of a barcode and a memory device.

18. The image processing apparatus according to claim 15, wherein said image reading device is a CCD scanner.

19. The image processing apparatus according to claim 15, said image processing section comprising:

an image memory for storing inputted image data;

a color gradation processing section;

a hypertone processing section; and a hypersharpness processing section, wherein said image data is subjected to necessary image processing and special image processing in said color gradation, hypertone and hypersharpness processing sections.

20. The image processing apparatus according to claim 15, wherein said necessary image processing includes at least one of color balance adjustment, contrast adjustment and adjustment correction, wherein said special image processing includes at least one of LF Lens Correction, Hypersharpness, Hypertone, Facial Expression Improvement, RP Finish, Monotone Finish, Brightness Enhancement, Fine Finish, Portrait Finish, Red Eye Correction, Cross Filter, Mirror, Negative/Positive Inverting, Color Pencil Touch, Poster Type, Posted Bill, Background Exchange and Layer Transparent processes, and wherein said unsuitable combinations of image processings including a predetermined combination of at least two separate special image processes are selected from the group consisting of LF Lens Correction, Hypersharpness, Hypertone, Facial Expression Improvement, RP Finish, Monotone Finish, Brightness Enhancement, Fine Finish, Portrait Finish, Red Eye Correction, Cross Filter, Mirror, Negative/Positive Inverting, Color Pencil Touch, Poster Type, Posted Bill, Background Exchange and Layer Transparent Processes.

* * * * *